United States Patent [19]

Weintraub

[11] 4,246,385
[45] Jan. 20, 1981

[54] PROCESS FOR REDUCING CONTENT OF UNREACTED VINYL HALIDE IN VINYL HALIDE POLYMERS

[75] Inventor: Lester Weintraub, Livingstone, N.J.

[73] Assignee: The Pantasote Company, Greenwich, Conn.

[21] Appl. No.: 639,369

[22] Filed: Dec. 10, 1975

Related U.S. Application Data

[63] Continuation-in-part of Ser. No. 534,420, Dec. 19, 1974, abandoned.

[51] Int. Cl.$^3$ .......................... C08F 6/24; C08F 2/20; C08F 14/06
[52] U.S. Cl. .................................. 526/207; 526/199; 526/200; 526/330; 526/344.2
[58] Field of Search .................... 260/92.8 W, 92.8 A, 260/86.3, 87.1, 87.5 C; 528/501, 503; 526/207

[56] References Cited

U.S. PATENT DOCUMENTS

| | | | |
|---|---|---|---|
| 2,875,186 | 2/1959 | Gerhard | 260/92.8 |
| 3,052,663 | 9/1962 | Bodlaender | 260/92.8 |
| 3,622,553 | 11/1971 | Cines | 526/344 X |
| 3,787,187 | 1/1974 | DeWitt | 23/285 |
| 3,790,542 | 2/1974 | Koyanagi | 260/92.8 |

FOREIGN PATENT DOCUMENTS 1150488  4/1969  United Kingdom ................ 526/344 X

OTHER PUBLICATIONS

Chem. Abst., 80, 146608(c).
Chem. Abst., 67, 100680y (1967).

*Primary Examiner*—C. A. Henderson
*Attorney, Agent, or Firm*—Jacobs & Jacobs

[57] ABSTRACT

Vinyl halide polymers and copolymers are formed in the presence of a linear, branched chain or cyclic alkane, and the polymer is then heated to remove the alkane and unreacted vinyl halide therefrom. The polymers so formed have reduced amounts of vinyl halide therein and hence are less likely to contaminate the air with airborne vinyl halide.

21 Claims, No Drawings

PROCESS FOR REDUCING CONTENT OF UNREACTED VINYL HALIDE IN VINYL HALIDE POLYMERS

This is a continuation-in-part of my earlier filed copending application Ser. No. 534,420, filed Dec. 19, 1974 now abandoned.

The present invention relates to the polymerization of vinyl halides, particularly vinyl chloride, and to a method and means for reducing the content of unreacted vinyl halide in the polymer.

The polymerization of vinyl halides, such as vinyl chloride, to form a homopolymer of the vinyl halide or a copolymer thereof with a copolymerizable monomer, such as a vinyl ester, an olefin, etc., is well known. To prepare polymers that are readily recoverable in particle form, as contrasted to latex form, suspension, solution or bulk polymerization techniques employing a catalyst or initiator are used. The polymerization is effected under pressure and elevated temperatures, e.g. 120°–140° F., are developed. At the end of the reaction, the pressure vessel used as the reactor is vented and the pressure is rapidly lowered to sub-atmospheric pressure to recover unreacted vinyl halide, and then the slurry of polymer is centrifuged and dried.

These techniques have been quite effective in the past, but as of Jan. 1, 1975 very stringent Federal regulations will impose very low levels of airborne vinyl chloride monomer that are permissible. Polyvinylchloride (PVC) containing large amounts of unreacted vinyl chloride is thus undesirable, since it may act to increase the airborne vinyl chloride content in areas where the PVC is stored or processed, thus necessitating costly measures to make those areas conform to the Federal standards.

It is thus an object of this invention to provide a method for reducing the content of unreacted vinyl halide monomer in a polymer of a vinyl halide.

This object is accomplished by the present invention by polymerizing the vinyl halide in the presence of an alkane, and heating the polymer thus obtained to remove unreacted vinyl halide and copolymerizable monomer.

It has been found that the presence of the alkane during the polymerization allows removal of greater quantities of unreacted vinyl halide and other monomer. It is believed that the alkane enters the oily phase containing the vinyl halide and thus is physically trapped inside the vinyl halide polymer. Removal of the alkane from the polymer also results in stripping additional amounts of unreacted vinyl halide therefrom, perhaps due to an increased porosity of the polymer arising from the use of the alkane.

Quite surprisingly, two further important effects have been noted. First, the polymer resulting from the stripping has enhanced dry blending properties, i.e. it will blend more rapidly with monomeric and polymeric plasticizers, pigments and other additives in conventional dry blending equipment, such as Banbury mixers, etc. In addition, it is possible to carry the polymerization to higher yields while still retaining the dry blending properties. Thus, in prior art polymerizations of vinyl halides, the reaction is terminated shortly after the pressure in the reactor starts to drop, and a pressure drop of 5 psi is conventionally employed to maximize the dry blending properties of the polymer. If larger pressure drops are used, the dry blending properties of the polymer are adversely affected. By the use of the alkane in the polymerization, pressure drops as much as 40 psi can be accepted while still obtaining a polymer with good dry blending properties. The present invention is operable in any vinyl halide polymerization technique that is employed to give recovery of polymer as particulate solids, namely suspension, solution or bulk polymerization. In all of these techniques, elevated pressure and an initiator are employed. The details of these polymerization techniques will not be set forth herein as they are well known and form no part of the present invention. Furthermore, the vinyl halide may be polymerized alone to form a homopolymer, or may be polymerized with up to 100% of a copolymerizable monomer, based on the vinyl halide, containing an ethylenically unsaturated double bond, e.g. vinyl esters, vinylidene halides, acrylonitrile, or olefins.

U.S. Pat. No. 3,324,097 describes an emulsion polymerization of vinyl chloride to obtain vinyl chloride latices, and proposes the use of hydrocarbons of at least 8 carbon atoms to prevent wet polymer build-up in the reaction vessel. In such a process, the polymer is recovered as a latex, which is not amenable to heating under reduced pressure for removal of unreacted monomer.

U.S. Pat. No. 3,488,328 proposes the use of alkanes as organic solvents in the polymerization of vinyl chloride to prevent adhesion of polymer scale to the wall of the polymerization vessel. British Pat. No. 1,129,012 proposes the addition to a vinyl chloride polymerization of a solution of a peroxide catalyst in hexane. U.S. Pat. Nos. 2,875,186 and 2,875,187 describe the use of an inert solvent, such as butane, pentane, hexane and heptane, to increase porosity of vinyl chloride polymers obtained from the suspension polymerization of the vinyl chloride in an aqueous medium having dissolved therein gelatin and methyl cellulose or gelatin, methyl cellulose and sorbitol.

In none of the prior art, however, is there any recognition that the content of unreacted vinyl halide in the poly(vinyl halide) can be reduced by carrying out the polymerization of the vinyl halide in the presence of an alkane and then stripping unreacted vinyl halide from the poly(vinyl halide) by heating the poly(vinyl halide) to a temperature of at least about 160° F. and a reduced pressure of about 50 to about 200 mm Hg.

The alkane is used in an amount sufficient to reduce the content of unreacted vinyl halide monomer in the polymer, e.g. from 0.1 to 10% by weight, based on the weight of the vinyl halide and copolymerizable monomer, preferably from 0.5 to 3% by weight. Since the alkane is stripped off after the polymerization, there is actually no upper limit on the amount to be employed, except that quite large amounts, e.g. more than 15% may give rise to odors in the resin. Since there is no point in using more of the alkane than is necessary, economics will dictate the use of smaller amounts where possible.

The alkane is preferably added along with the reactants charged to the polymerization vessel. If desired, however, the alkane may be added in a manner known per se, during the course of the polymerization.

Suitable alkanes for use in the invention are straight, branched chain or cyclic alkanes, and the term "alkane" as used herein and in the appended claims includes straight, branched and cyclic structures. Any alkane may be used, preferably those that can be removed from the polymer at the stripping conditions, such as alkanes of 1 to 20 carbon atoms, preferably 1 to 15 carbon atoms, and most preferably 5 10 carbon atoms. While straight, branched or cyclic alkanes may be employed, it is presently preferred to use normal or secondary alkanes, such as n-pentane, i-hexane, n-heptane and i-octane.

The alkane is removed from the polymer at the end of the reaction by heating the polymer containing the alkane and unreacted monomer at a temperature of at least about 160° F. at reduced pressure for a suitable period of time to ensure maximum removal of the alkane and unreacted monomer from the slurry obtained from the polymerization, e.g. 15 to 180 minutes. Here again, economics will dictate the ultimate selection of operating parameters.

For example, the polymer is usually at an elevated temperature at the end of the reaction, say about 110° to about 115° F., and hence a stripping temperature of at least about 160° F. will be used. Temperatures closely approaching 230° F. tend to adversely affect the dry blending properties of the polymer and would not normally be employed. However, if the advantages of using temperatures higher than 230° F. were justified from the overall economics, then such temperatures could be used. Normally, however, a stripping temperature of at least about 160° F., preferably to provide an increase in the temperature of the polymer of at least about 15° F., such as about 160° F. to about 200° F., e.g. 160° F. to 180° F., may be employed to advantage.

Generally, the efficiency of the stripping is an inverse function of the pressure, and hence it is preferred to use reduced pressure. Here again, the degree of vacuum used depends on a trade-off of increased stripping efficiency versus the cost of vacuum equipment. A suitable range of pressure is from about 50 to about 200 mm Hg, and most preferably 75 to 150 mm Hg.

After stripping the alkane and unreacted vinyl halide from the slurry, the pressure is brought back to atmospheric and the slurry is centrifuged to remove water from the slurry, and then the polymer is dried in a conventional manner, e.g. at a temperature of 125° F. to 350° F. and atmospheric pressure.

In the most preferred embodiment of the invention, the reaction mass obtained from the polymerization is subjected to reduced pressure to recover unreacted vinyl halide monomer and to remove water vapor (where present) and then the polymer is heated to a temperature of at least about 160° F., preferably about 160° to about 200° F., at a pressure of from 50 to 200 mm Hg. for such time as to effect significant removal of unreacted vinyl halide from the polymer, such as from about 15 minutes to 180 minutes. After the stripping, the pressure is brought back to atmospheric and the polymer is sent to centrifugation and drying.

The present invention finds particular utility in a suspension polymerization, since this is normally used to prepare resins that are suitable for dry blending. Also, suspension polymerization accounts for the largest production of vinyl resins. In a suspension polymerization, a pressure vessel is charged with water and the monomer or monomer mixture, catalyst, protective colloid and other ingredients are added to the water and the polymerization reaction is allowed to proceed at the desired temperature, with cooling if necessary to maintain the temperature. The degree of completion is determined by the amount of pressure drop before the reaction is terminated, as described above.

Charged to the reactor is a mixture generaly comprising:

| | Parts |
|---|---|
| Vinyl halide and copolymerizable monomer | 100 |
| Water | 100–400 |
| Dispersing agent (protective colloid) | 0.03–0.3 |
| Catalyst | 0.01–0.15 |

Other recipes may be used, as described in the art. Suitable dispersing agents include the water soluble protective colloids such as gelatin, partially or completely hydrolyzed polyvinyl acetate, polyalkylene oxides such as polyethylene oxide, methyl cellulose or hydroxyethyl cellulose. Suitable catalysts include diacyl peroxides such as lauroyl and benzoyl peroxide; peroxydicarbonates such as diisopropyl peroxydicarbonate; acyl cycloalkyl sulphonyl peroxides such as acetyl cyclohexyl sulphonyl peroxide; and azo compounds such as $\alpha,\alpha'$-azodiisobutyronitrile.

After the reaction has proceeded to the desired degree, the reactor is vented to remove water vapor and unreacted vinyl halide and other monomer, and the pressure is reduced to the desired degree of vacuum. To heat the polymer, a heated jacket or introduction of steam into the reactor or any other suitable heating may be used. When the stripping of the alkane and unreacted monomer is completed, the vessel is brought back to atmospheric pressure and the stripped slurry is sent to drying storage, blending, etc. just as in the case of conventional vinyl polymers.

The Examples that follow also illustrate the invention in terms of a suspension polymerization, but the scope of the invention is not to be limited thereto.

In the specification and appended claims, all parts and proportions referred to are by weight, unless otherwise noted. Further, the percentage of alkane in Examples I–V is based on the weight of vinyl halide and copolymerizable monomer, and the vinyl chloride content in ppm is based on dry solids.

EXAMPLE I

Several production runs in a commercial PVC reactor were made by charging to the reactor for each run the following mixture:

| | |
|---|---|
| Demineralized water | 1100 gallons |
| Vinyl chloride | 760 gallons |
| IPP* | 1 pound |
| Methocel 60 HG 50* | 3.5 pounds |
| Sodium bicarbonate (buffer) | 1.0 pound |

*IPP is diisopropyl peroxy dicarbonate
*Methocel 60 HG 50 is a methyl cellulose derivative manufactured by Dow Chemical Company These runs served as controls. Additional runs were made using the same mixture but including 57.5 pounds of Soltrol 10, a mixture of 90–95% isooctanes and the remainder other isoparaffins. The runs were carried out by heating the reaction mass to 131° F., and the pressure rose to about 115 psig. After 8–9 hours, the pressure fell to 110 psig. and the reaction was terminated by venting the reactor. After venting, the pressure was reduced to −10 inches Hg and steam was admitted to the reactor to heat the polymer mass to 180° F. During steam addition, the vacuum was increased to −25 inches Hg, and the polymer mass held at 175–180° F. at this pressure for 30 minutes, after which time the vacuum was broken and the slurry sent to centrifugation and drying. Samples of the wet cake and fully dried resin for each run were obtained for each run, and the results are reported in Table I below. The results are reported as an average of several runs of each type.

TABLE I

|  | Control | Invention |
|---|---|---|
| Isooctane (% of vinyl chloride) | 0 | 1 |
| Stripping Temp. (°F.) | 180 | 180 |
| Stripping Pressure (in. Hg) | −25 | −25 |
| Stripping Time (min.) | 30 | 30 |
| Vinyl chloride (ppm) |  |  |
| wet cake | 224 | 28 |
| dry cake | 50 | 2.7 |
| DOP dry-up time (min.) | 4.0 | 3.1 |
| TOTM dry-up time (min.) | 7.6 | 4.1 |

The DOP and TOTM dry-up times are a measure of the dry blending properties of the polymer and are determined as follows. In both tests, a charge comprising the resin, stabilizer and filler is mixed in a sigma head mixer of 650 ml capacity at 87° C. ±0.1° C. for 5 minutes, after which time dioctylphthalate (DOP) or trioctyl-trimellitate (TOTM) is added over a period of 1 minute. The mixer is connected to a Brabender plasticorder and the transition point from a wet lumpy mixture to a dry free-flowing mixture is read from the plasticorder chart. The DOP or TOTM dry-up time is reported as the time in minutes from the addition of the DOP or TOTM to the transition point.

The charge used for the DOP dry-up time is:
  210 grams resin
  21 grams basic white lead carbonate
  15 grams No. 33
  109 grams DOP.

The charge for the TOTM dry-up time is:
  200 grams resin
  8 grams epoxidized soybean oil
  18 grams dibasic lead phthalate
  1 gram aristo wax 165
  20 grams clay No. 33
  96 grams TOTM As can be seen from Example I, there is a remarkable reduction in the amount of unreacted vinyl chloride when the alkane is used, as well as an improvement in dry-blending properties. Samples of the control and invention run were placed in glass stoppered Erlenmeyer flasks and heated at 65° C. for one hour. On opening the flasks, no odor was detected.

Eighteen thousand pounds of the polymer prepared using the alkane were dry-blended with a commercial blend of pigments, etc. using production techniques, and a commercially acceptable dry blend was prepared.

EXAMPLE II

Following the procedure of Example I, six additional runs were made, Runs 1 and 2 employing no isooctane and hence being control runs, and Runs 3-6 using 1% isooctane and hence illustrating the invention. Runs 1 through 3 employed a 5 psi pressure drop, which is the pressure drop most commonly used in the production of dry blending vinyl chloride homopolymers. Runs 4, 5 and 6 employed pressure drops of 10, 15 and 20 psi, respectively, and thus resulted in substantially greater yield of polymer. The polymer obtained from the six runs was analyzed for unreacted vinyl chloride in the wet cake and the dry blending properties. The results are reported in Table II below.

TABLE II

| Run | 1 | 2 | 3 | 4 | 5 | 6 |
|---|---|---|---|---|---|---|
| Pressure Drop (psi) | 5 | 5 | 5 | 10 | 15 | 20 |
| Vacuum Strip Temp. (°F.) | 180 | 180 | 180 | 180 | 180 | 180 |
| Vacuum Strip Pressure (in Hg) | −25 | −25 | −25 | −25 | −25 | −25 |
| Vacuum Strip Time (min.) | 30 | 30 | 30 | 30 | 30 | 30 |
| Iso-octane (%) | 0 | 0 | 1 | 1 | 1 | 1 |
| Vinyl chloride (ppm) |  |  |  |  |  |  |
| wet cake | 245 | 289 | 37 | 164 | 75 | 232 |
| DOP dry-up time (min.) | 3.7[1] | 4.0[1] | 2.3[2] | 2.6[2] | 2.5[2] | 2.7[2] |
| TOTM dry-up time (min.) | — | 6.7 | 4.2 | 5.8 | 5.5 | 4.5 |

[1]Standard = 3.3 min.
[2]Standard = 2.8 min.

It can be seen from the data in Table II that the stripping temperature of 180° adversely affected the dry blending properties of Runs 1 and 2, which represented the control runs, since these runs had a longer DOP dry-up time than the standard of 3.3 minutes established for the polymer made under the ambient conditions of that day. All of Runs 3 through 6 resulted in PVC that had substantially better dry blending properties than the standard used for the specific conditions of runs being made in the period of Runs 3 through 6. This is true even for Runs 4 through 6, which carried the reaction toward the higher yields represented by the large pressure drops. This is contrary to expectations, since normally the combination of higher drying temperatures and higher yield is accompanied by a loss of dry blending properties.

EXAMPLE III

Following the procedure of Example I, a vinyl chloridevinyl acetate copolymer was prepared from the mixture below, using a polymerization temperature of 150° F. and a vent pressure of 40 psig:
  Vinyl chloride: 91 pounds
  Vinyl acetate: 9 pounds
  IPP: 4.5 grams
  Lauroyl peroxide: 68 grams
  Gelatin (100 Bloom): 159 grams
  Sodium bicarbonate: 23 grams
  Trichloroethane: 272 grams
  Water: 160 pounds Three runs were made. In Runs 1 and 2 the above mixture was used, and in Run 3 the mixture included 1% of isooctane. After the reactors were vented, the polymer mass was kept at the polymerization temperature in the case of Run 1, or heated to 165° F. in the case of Runs 2 and 3, to strip gases and unreacted vinyl chloride and vinyl acetate from the polymer. A strip time of 120 minutes was used for all three runs at a pressure of <25 inches Hg. The unreacted vinyl chloride was measured in the wet cake and dry cake as described above, and the results are reported in Table III below.

TABLE III

| Run | 1 | 2 | 3 |
|---|---|---|---|
| Isooctane (%) | 0 | 0 | 1 |
| Stripping Temp. (°F.) | 150 | 165 | 165 |
| Stripping Press. (in. Hg) | −25 | −25 | −25 |
| Stripping Time (min.) | 120 | 120 | 120 |
| Vinyl chloride (ppm) |  |  |  |

TABLE III-continued

| Run | 1 | 2 | 3 |
|---|---|---|---|
| wet cake | 4204 | 1284 | 376 |
| dry cake | 3300 | 1035 | 240 |

EXAMPLE IV

Following the procedure of Example I, three batches of PVC were prepared at a polymerization temperature of 145° and a vent pressure of 120 psig. Run 1 was a control, and Runs 2 and 3 employed 1% n-heptane. The unreacted vinyl chloride content in the wet and dry cake were determined, and the results are reported in Table IV below.

TABLE IV

| Run | 1 | 2 | 3 |
|---|---|---|---|
| n-heptane (%) | 0 | 1 | 1 |
| Stripping Temp. (°F.) | 145 | 145 | 170 |
| Stripping Press. (in. Hg) | −25 | −25 | −25 |
| Stripping Time (min.) | 60 | 60 | 60 |
| Vinyl Chloride (ppm) | | | |
| wet cake | 13816 | 2651 | 486 |
| dry cake | 7496 | 946 | 322 |

EXAMPLE V

Following the procedure of Example 1, two batches of vinyl chloride homopolymer were prepared using a polymerization temperature of 131° F. and a pressure drop of 30 psi. Run 1 contained no alkane and Run 2 contained 1% of iso-hexane. At the end of the reaction, the polymer was heated to a temperature of 160° F. pressure of −25 inches Hg for 60 minutes. The unreacted vinyl chloride content was determined in the wet and dry cake and the DOP dry-up time was also determined for both runs. The results are reported in Table V below.

TABLE V

| Run | 1 | 2 |
|---|---|---|
| Iso-hexane (%) | 0 | 1 |
| Stripping Temp. (°F.) | 160 | 160 |
| Stripping Press. (in. Hg) | −25 | −25 |
| Stripping Time (min.) | 60 | 60 |
| Vinyl Chloride (ppm) | | |
| wet cake | 1350 | 340 |
| dry cake | 284 | 60 |
| DOP dry-up time (min.) | 5.8 | 4.5 |

As can be seen from the above Examples, the use of the alkane in reducing the content of unreacted vinyl chloride in the polymer is not limited to vinyl halide polymers employed for dry blending only. Thus, the present invention is applicable to the production of vinyl halide homopolymers and copolymers that are formed into thick sheets or thin films, that are injection molded or compression molded or extruded into articles of desired shape, and to such homopolymers and copolymers that are blended with the usual range of additives by dry blending or by any other technique. While the use of the alkane does improve the dry blending properties of such resins that are ultimately dry blended, there is a significant reduction of unreacted vinyl halide in the vinyl halide homopolymers and copolymers, regardless of whether or not such polymers are used for dry blending.

What is claimed is:

1. In the suspension, solution or bulk polymerization of a monomer system selected from the group consisting of a vinyl halide and a mixture of a vinyl halide and up to 100%, by weight of the vinyl halide, of at least one copolymerizable monomer under elevated pressure in a pressure reactor vessel to form a slurry of a polymer thereof in solid form, the improvement which comprises effecting the polymerization in the pressure of an alkane in an amount at least sufficient to reduce the content of unreacted vinyl halide in said polymer, reducing the pressure in said reactor vessel to atmospheric pressure at the termination of the polymerization, and thereafteer stripping unreacted vinyl halide from said polymer by heating the slurry of polymer obtained from the polymerization to a temperature of at least about 160° F. and at a pressure of about 50 mm Hg to about 200 mm Hg.

2. The process according to claim 1, wherein said polymerization is the suspension polymerization of said monomer system.

3. The process according to claim 1, wherein said alkane has 1 to 20 carbon atoms.

4. The process according to claim 3, wherein said alkane is a normal or secondary alkane.

5. The process according to claim 4, wherein said alkane has 5 to 10 carbon atoms.

6. In the suspension, solution or bulk polymerization of a monomer system selected from the group consisting of a vinyl halide and a mixture of a vinyl halide and up to 100%, by weight of the vinyl halide, of at least one copolymerizable monomer under elevated pressure in a pressure reactor vessel to form a slurry of a polymer thereof in solid form, the improvement which comprises effecting the polymerization in the presence of an alkane selected from the group consisting of i-hexane, n-heptane or i-octane in an amount at least sufficient to reduce the content of unreacted vinyl halide in said polymer, reducing the pressure in sid reactor vessel to atmospheric pressure at the termination of the polymerization, and thereafter stripping unreacted vinyl halide from said polymer by heating the slurry of polymer obtained from the polymerization to a temperature of at least about 160° F. and at a pressure of about 50 mm Hg to about 200 mm Hg.

7. The process according to claim 1, wherein said stripping is at about 160° F. to about 200° F.

8. The process according to claim 1, wherein said stripping is at about 160° F. to about 180° F.

9. The process according to claim 1, wherein said heating is at a temperature at least 15° F. higher than the temperature of the polymer after said venting.

10. The process according to claim 1, wherein said alkane is in an amount of from abut 0.1 to about 10%, based on the monomer system.

11. The process according to claim 1, wherein said alkane is present from the start of the polymerization.

12. The process according to claim 1, wherein said polymer is a homopolymer of vinyl chloride or a copolymer of vinyl chloride and up to 100% by weight of the vinyl chloride of one or more copolymerizable monomers.

13. The process according to claim 12, wherein said polymer is a copolymer of vinyl chloride and a vinyl ester.

14. The process according to claim 1, wherein said polymerization is the suspension polymerization of vinyl chloride under elevated pressure in a pressure vessel to form a vinyl chloride homopolymer, the polymerization is terminated by reducing the pressure in the vessel to atmospheric pressure when the pressure in the vessel shows a pressure drop of between about 5 and about 30 psi, and the slurry thus obtained comprising vinyl chloride homopolymer is heated to a temperature of at least about 160° F. at a pressure of from about 50 to about 200 mm Hg for stripping of said alkane and unreacted vinyl chloride.

15. The process according to claim 14, wherein said slurry is subjected to said stripping in said pressure vessel.

16. The process according to claim 14, wherein said alkane is in an amount of from about 0.1 to about 10%, based on the monomer system.

17. The process according to claim 14, wherein said alkane has 1 to 20 carbon atoms.

18. The process according to claim 17, wherein said alkane is in an amount of from about 0.1 to about 10%, based on the monomer system.

19. The process according to claim 16, wherein said stripping is at about 160° to about 200° F.

20. The process according to claim 16, wherein said stripping is at about 160° to about 180° F.

21. The process according to claim 20, wherein said stripping is for about 10 to about 180 minutes.

* * * * *